United States Patent
Miyamoto et al.

(10) Patent No.: US 9,255,821 B1
(45) Date of Patent: Feb. 9, 2016

(54) OPTICAL FIBER VIBRATION SENSOR

(71) Applicant: AFL Telecommunications LLC, Duncan, SC (US)

(72) Inventors: Matsuhiro Miyamoto, Greenville, SC (US); Sean Foley, Simpsonville, SC (US); Jeffrey Jamieson, Anderson, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/081,325

(22) Filed: Nov. 15, 2013

Related U.S. Application Data

(60) Provisional application No. 61/726,757, filed on Nov. 15, 2012.

(51) Int. Cl.
    G01B 9/02      (2006.01)
    G01D 5/353     (2006.01)
    G01J 9/02      (2006.01)
    G01D 5/26      (2006.01)
    G01H 9/00      (2006.01)

(52) U.S. Cl.
    CPC ............ G01D 5/35322 (2013.01); G01D 5/266 (2013.01); G01D 5/268 (2013.01); G01D 5/35303 (2013.01); G01D 5/35306 (2013.01); G01H 9/004 (2013.01); G01J 9/02 (2013.01); G01J 2009/0226 (2013.01)

(58) Field of Classification Search
    CPC ................ G01J 9/02; G01J 2009/0226; G01J 2009/0276; G01L 1/24; G01D 5/35322; G01D 5/266; G01D 5/268; G01D 5/35303; G01D 5/35306; G01H 9/004; E21B 47/123
    See application file for complete search history.

(56) References Cited

U.S. PATENT DOCUMENTS

| | | | |
|---|---|---|---|
| 5,208,455 A * | 5/1993 | Nelson et al. | 250/227.19 |
| 5,355,208 A * | 10/1994 | Crawford et al. | 356/35.5 |
| 5,402,231 A | 3/1995 | Udd | |
| 5,694,114 A * | 12/1997 | Udd | 340/506 |
| 6,208,590 B1 | 3/2001 | Kim et al. | |
| 6,456,381 B1 | 9/2002 | Nakamura et al. | |
| 6,728,165 B1 | 4/2004 | Roscigno et al. | |
| 6,798,524 B2 | 9/2004 | Takashima et al. | |
| 7,992,440 B2 | 8/2011 | Kumagai et al. | |
| 8,395,782 B2 * | 3/2013 | Patel et al. | 356/483 |
| 2012/0224169 A1 * | 9/2012 | Kumagai et al. | 356/73.1 |

* cited by examiner

*Primary Examiner* — Michael A Lyons
(74) *Attorney, Agent, or Firm* — Nelson Mullins Riley & Scarborough, LLP

(57) ABSTRACT

A fiber optic sensor comprising a first light source, a second light source, a first optical coupler operatively connected with the first light source, and a second optical coupler operatively connected with the second light source. The first optical coupler directs first and second optical waves along a first optical path into first and second ends of an optical fiber such that the first and second optical waves interfere to form a first combined optical wave. The second optical coupler directs the third and fourth optical waves along a second optical path into the first and second ends of the optical fiber such that the third and fourth optical waves interfere to form a second combined optical wave. The second optical path is longer than the first optical path by a predetermined distance. Detectors receive the first and second combined optical waves and output information with respect thereto.

18 Claims, 4 Drawing Sheets

OPTICAL FIBER VIBRATION SENSOR

PRIORITY CLAIM

This application is based upon and claims the benefit of U.S. provisional application Ser. No. 61/726,757, filed Nov. 15, 2012, which is incorporated fully herein by reference.

FIELD OF THE INVENTION

The present invention relates generally to fiber optic interferometric sensors. More specifically, the present invention relates to a reduced-diameter fiber optic sensor for detecting vibrations for downhole applications in oil and gas wells.

BACKGROUND OF THE INVENTION

Fiber optic interferometric sensors are known in the art and have been used to detect environmental effects, such as strain, temperature, acceleration, acoustic signals, and vibrations. In one type of sensor based on a Sagnac interferometer, also known as an optical fiber ring interference sensor, an optical wave is split and directed in clockwise and counterclockwise directions around an optical fiber loop. The waves interfere at an optical coupling element after passing through the loop. A phase difference between the two waves is caused when the optical fiber loop is exposed to an environmental effect, and the intensity of the combined wave is based on the relative phase of each of the clockwise and counterclockwise optical waves. The sensor then employs a signal processor to analyze the intensity variations and determine information about the environmental effect. Additional information regarding optical fiber ring interference sensor configurations is provided in U.S. Pat. No. 6,798,524 to Takashima et al., the entire disclosure of which is incorporated by reference herein in its entirety for all purposes.

It is also known to measure amplitude and position of vibrations using a distributed sensor comprising a combination of wavelength division multiplexed Sagnac interferometers operating on different wavelengths. Such a sensor is disclosed in U.S. Pat. No. 5,402,231 to Udd, which is incorporated by reference herein in its entirety for all purposes.

SUMMARY

The present invention recognizes and addresses disadvantages of prior art constructions and methods. According to one embodiment, the present invention provides a fiber optic sensor, comprising a sensing loop for sensing an environmental effect, a first light source producing first wavelength light, a second light source producing second wavelength light, a first optical coupler operatively connected with the first light source that splits the first wavelength light into first and second optical waves, and a second optical coupler operatively connected with the second light source that splits the second wavelength light into third and fourth optical waves. The sensing loop comprises an optical fiber having a first end and a second end, and the first optical coupler is operative to direct the first and second optical waves along a first optical path into the first and second ends of the optical fiber, respectively, such that the first optical wave propagates around the sensing loop to the second end of the optical fiber, the second optical wave propagates around the sensing loop to the first end of the optical fiber, and the first and second optical waves interfere at the first optical coupler to form a first combined optical wave. Additionally, the second optical coupler is operative to direct the third and fourth optical waves along a second optical path into the first and second ends of the optical fiber, respectively, such that the third optical wave propagates around the sensing loop to the second end of the optical fiber, the fourth optical wave propagates around the sensing loop to the first end of the optical fiber, and the third and fourth optical waves interfere at the second optical coupler to form a second combined optical wave. Notably, the second optical path is longer than the first optical path by a predetermined distance. The fiber optic sensor further comprises a first detector operative to receive the first combined optical wave and output information regarding the first combined optical wave and a second detector operative to receive the second combined optical wave and output information regarding the second combined optical wave.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
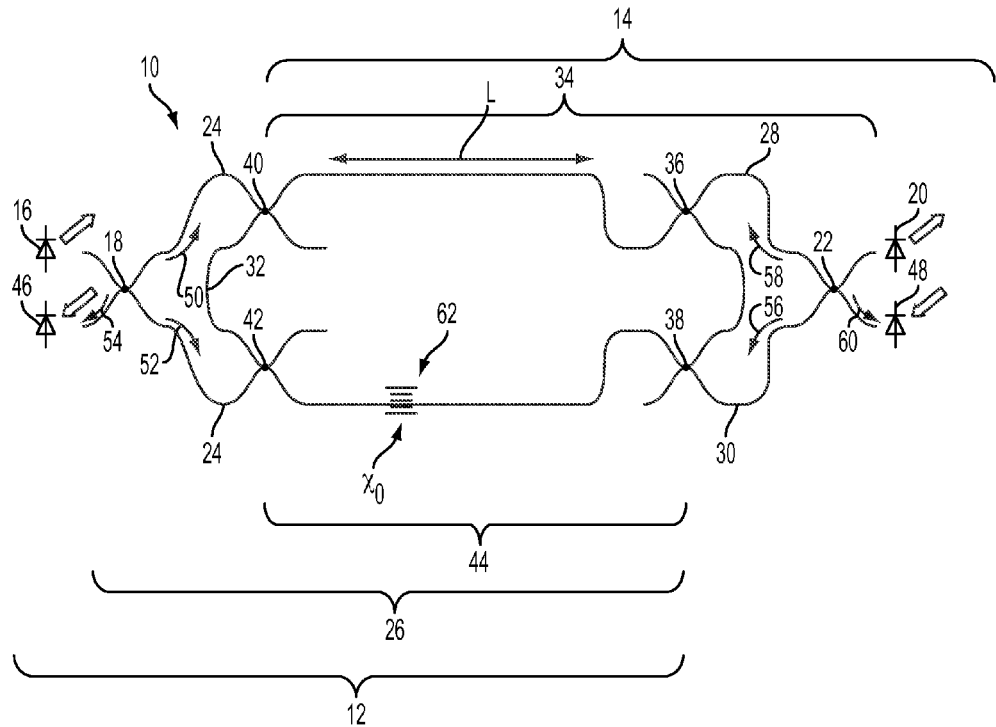
FIG. 1 is a schematic representation of a conventional fiber optic sensor employing dual Sagnac interferometers operating in opposite directions on a common fiber optic sensing loop.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In general, embodiments of the present invention relate to a fiber optic sensor. Although preferred embodiments of the present invention are described below in the context of sensing vibrations acting on a downhole cable in oil and gas well applications, those of ordinary skill in the art will appreciate that the present invention is not so limited. In fact, it will be appreciated that embodiments of the sensor of the present invention are useful in many different sensing applications.

To facilitate explanation of preferred embodiments of the present invention, a conventional fiber optic sensor 10 employing dual Sagnac interferometers will be described with reference to FIG. 1. Fiber optic sensor 10 comprises a first Sagnac interferometer 12 and a second Sagnac interferometer 14. First Sagnac interferometer 12 comprises a light source 16 coupled to a port of an optical coupler 18. Light source 16 may be, for example, a light emitting diode, laser diode, or the like operating at a wavelength of 1.31 µm. Similarly, second Sagnac interferometer 14 comprises a light source 20 coupled to a port of an optical coupler 22. Light source 20 is preferably analogous to light source 16 but operating at a wavelength of 1.55 µm.

An optical fiber 24 forms a first Sagnac loop 26 beginning and ending at optical coupler 18. Similarly, in conjunction with optical fiber 24, optical fibers 28, 30, and 32 form a second Sagnac loop 34 beginning and ending at optical coupler 22. In particular, optical fibers 28, 30, and 32 may be connected with optical fiber 24 via bidirectional wavelength division multiplexing (WDM) couplers 36, 38, 40, and 42, respectively, to form a continuous optical path for light having a specific wavelength. First and second Sagnac loops 26, 34 are the same length. Thus, optical fibers 24, 28, 30, and 32 together form a sensing loop 44 having length 2L such that first Sagnac loop 26 and second Sagnac loop 34 have a common optical path. As those of skill in the art will appreciate, and as described in more detail below, WDM couplers 36, 38, 40, and 42 are operative to multiplex and demultiplex 1.55 µm wavelength light with 1.31 µm light propagating along optical fiber 24. WDM couplers 36, 38, 40, and 42 are configured to allow 1.31 µm light to pass through without being coupled to other optical fibers. A detector 46 for light having a wavelength of 1.31 µm is coupled to another port of optical coupler 18. Likewise, a detector 48 for light having a wavelength of 1.55 µm is coupled to another port of optical coupler 22.

In use, an optical wave having a wavelength of 1.31 µm from light source 16 enters optical coupler 18, where it is split into clockwise and counterclockwise propagating optical waves 50 and 52. Clockwise optical wave 50 travels around first Sagnac loop 26, passing WDM couplers 40, 36, 38, and 42, before returning to optical coupler 18. Similarly, counterclockwise optical wave 52 travels around first Sagnac loop 26 in the opposite direction, passing WDM couplers 42, 38, 36, and 40, before returning to optical coupler 18. Upon their return, optical waves 50 and 52 interfere at optical coupler 18 to form a combined optical wave 54. Optical wave 54 is detected at detector 46, which transmits signals regarding the intensity of optical wave 54 to suitable signal processing circuitry (not shown in FIG. 1).

In a similar fashion, an optical wave having a wavelength of 1.55 µm from light source 20 enters optical coupler 22, where it is split into clockwise and counterclockwise propagating optical waves 56 and 58. Clockwise optical wave 56 travels around second Sagnac loop 34, first encountering WDM coupler 38. As noted above, WDM coupler 38 is operative to multiplex 1.55 µm wavelength light with the 1.31 µm wavelength light propagating along optical fiber 24. Optical wave 56 then encounters WDM coupler 42, which is operative to decouple the 1.55 µm wavelength light from optical fiber 24 onto optical fiber 32. Next, optical wave 56 encounters WDM coupler 40, which again couples the 1.55 µm wavelength light with the 1.31 µm wavelength light propagating along optical fiber 24. Finally, optical wave 56 encounters WDM coupler 36, which decouples the 1.55 µm wavelength light from optical fiber 24 onto optical fiber 28. Optical wave 56 then returns to optical coupler 22.

Likewise, counterclockwise optical wave 58 travels around second Sagnac loop 34 in the opposite direction, first encountering WDM coupler 36. WDM coupler 36 multiplexes 1.55 µm wavelength light with the 1.31 µm wavelength light propagating along optical fiber 24. Optical wave 58 then encounters WDM coupler 40, which is operative to decouple the 1.55 µm wavelength light from optical fiber 24 onto optical fiber 32. Next, optical wave 58 encounters WDM coupler 42, which again couples the 1.55 µm wavelength light with the 1.31 µm wavelength light propagating along optical fiber 24. Finally, optical wave 58 encounters WDM coupler 38, which decouples the 1.55 µm wavelength light from optical fiber 24 onto optical fiber 30. Optical wave 58 then returns to optical coupler 22. Upon their return, optical waves 56 and 58 interfere at optical coupler 22 to form a combined optical wave 60. Optical wave 60 is detected at detector 48, which transmits signals regarding the intensity of optical wave 60 to the signal processing circuitry mentioned above.

Importantly, when an environmental effect, such as a vibration 62, acts at a point $x_0$ on sensing loop 44, vibration 62 modulates the length of a section of the optical path along sensing loop 44 at the frequency of vibration 62. As a result, the counter-propagating optical waves 50, 52 will arrive at optical coupler 18 at different times. Thus, there will be a phase difference between optical waves 50, 52 which depends on the position of vibration 62 along sensing loop 44. The same is true for counter-propagating optical waves 56, 58.

More particularly, the phase difference may be expressed as a change in length by a function $x(t, x=x_0)$. Further, assuming that the phase change is slow with respect to the optical carrier frequency, this phase difference may be approximated by $$\frac{dx}{dt}(x=x_0)*t+c,$$

where c is the speed of light in a vacuum and t is time. Consequently, the phase difference $\Delta\phi_{1.3}$ between optical waves 50, 52 can be determined using the following equation:

$$\Delta\phi_{1.3} = \frac{2\pi}{\lambda_{1.3}} \cdot \frac{dx}{dt}(x=x_0) \cdot \left(t - \frac{2(L-x_0)}{v}\right)$$

where $\lambda_{1.3}$ is the wavelength of 1.31 µm, 2L is the loop length, and v is the speed of light in the medium. Similarly, the phase difference $\Delta\phi_{1.5}$ between optical waves 56, 58 can be determined using the following equation:

$$\Delta\phi_{1.5} = \frac{2\pi}{\lambda_{1.5}} \cdot \frac{dx}{dt}(x=x_0) \cdot \left(t - \frac{2x_0}{v}\right)$$

where $\lambda_{1.5}$ is the wavelength of 1.55 µm.

The intensities of combined optical waves 54 and 60 depend on the relative phase differences between optical waves 50, 52 and 56, 58, respectively. Further, variations in intensity are proportional to the position and amplitude of vibration 62 on sensing loop 44. Because of the arrangement of second Sagnac loop 34 opposite first Sagnac loop 26, the signals output from detectors 46, 48 vary in opposite directions with the position of vibration 62.

Based on the above, the signal processing circuitry can determine the ratio of the output signals to determine the location of vibration 62 along sensing loop 44 and sum the output signals to determine the amplitude of vibration 62. More particularly, for a vibration occurring at a point $x_0$ along sensing loop 44, the location on the vibration is determined by the following equation:

$$x_0 = \frac{L}{1 + \frac{\lambda_{1.3} \cdot \Delta\phi_{1.3}}{\lambda_{1.5} \cdot \Delta\phi_{1.5}}}$$

Similarly, the amplitude of the vibration at $x_0$ $$\frac{dx}{dt}(x = x_0),$$

is determined by the following equation:

$$\frac{dx}{dt}(x = x_0) = \left(\frac{c}{n}\right) \cdot (\lambda_{1.3} \cdot \Delta\phi_{1.3} + \lambda_{1.5} \cdot \Delta\phi_{1.5})$$

where n is the index of refraction of the optical fiber.

Figure 2:
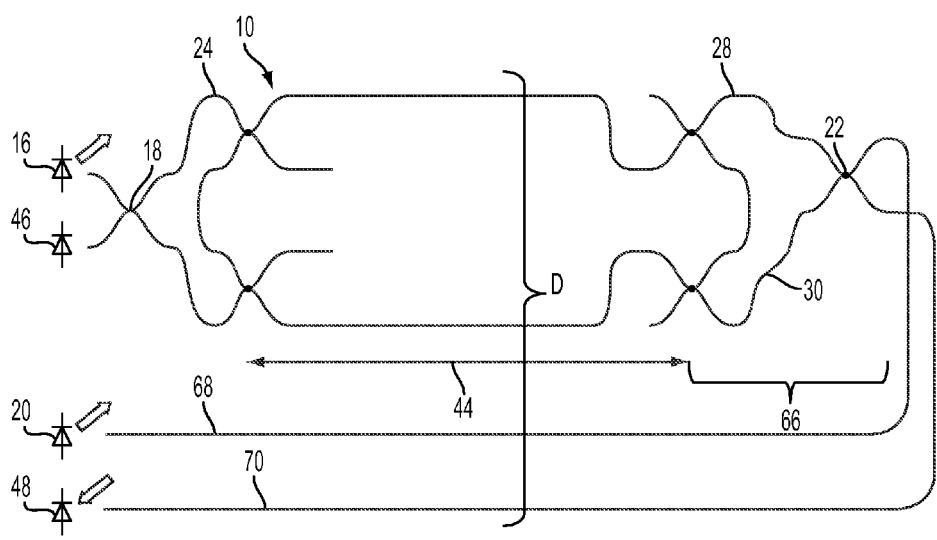
FIG. 2 is a schematic representation of the conventional fiber optic sensor of FIG. 1 configured for use in a cable.

However, the configuration of the above-described fiber optic sensor 10 is unsuitable for use in a number of applications where fiber optic vibration sensing would be useful. For example, FIG. 2 is a schematic representation of the conventional fiber optic sensor 10 configured for use in a cable. Fiber optic sensor 10 has a near end 64 at the entrance of the cable and a far end 66 at the terminus of the cable. Light source 16, optical coupler 18, WDM couplers 40, 42, and detector 46 are located at near end 64, and, because the configuration of fiber optic sensor 10 requires second Sagnac loop 34 to be opposite first Sagnac loop 26, optical coupler 22 and WDM couplers 36, 38 are located at far end 66. Because of size constraints, however, light source 20 and detector 48 must be located at near end 64, while approach and return optical fibers 68, 70 respectively extend from light source 20 and detector 48 along the length of the cable. At far end 66, approach fiber 68 is coupled with optical fiber 28, and return fiber 70 is coupled with optical fiber 30. Splicing parts are stored in a closure for protection.

As indicated in FIG. 2, the cable in which fiber optic sensor 10 is used must have a diameter D. This diameter, which is sized to accommodate the components at far end 66, is much larger than the diameter of a typical downhole cable for oil and gas well applications, which is typically only several millimeters. Thus, the arrangement of fiber optic sensor 10 cannot be used in downhole cables for oil and gas wells. Moreover, if optical coupler 22 and WDM couplers 36, 38 are moved to near end 64 such that second Sagnac loop 34 operates in the same direction as first Sagnac loop 26, it is not possible to calculate the position and amplitude of vibration 62 because the signals output from detectors 46, 48 would no longer vary in opposite directions with the position of vibration 62.

Additionally, it is known to form an optical ring interference sensor using a 3-port optical coupler with 3 photodetectors. As described in U.S. Pat. No. 6,798,524 to Takashima et al., this configuration desirably yields a linear relationship between the detected light intensity and the phase difference between the counter-propagating optical waves. Importantly, this can improve the sensitivity of the optical ring interference sensor by improving calculation of the phase difference. However, as shown in the '524 patent, this type of sensor requires at least three optical fibers coupled to the WDM coupler.

Figure 3:
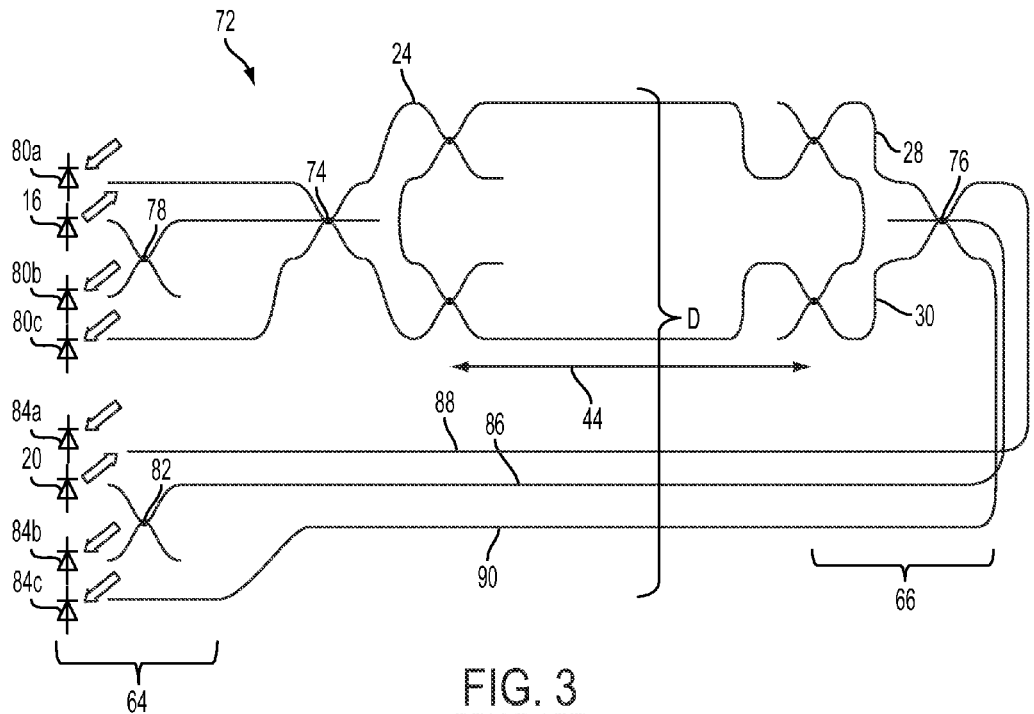
FIG. 3 is a schematic representation of a conventional fiber optic sensor employing a 3-port optical coupler configured for use in a cable.

In this regard, FIG. 3 is a schematic representation of a conventional fiber optic sensor 72, in many respects analogous to fiber optic sensor 10, but employing 3-port optical couplers 74 and 76 in place of optical couplers 18 and 22 in first and second Sagnac interferometers 12 and 14, respectively. Fiber optic sensor 72 is likewise configured for use in a cable. In this sensor, first Sagnac interferometer 12 additionally comprises an optical coupler 78 interposed between light source 16 and 3-port optical coupler 74 and three detectors 80a, 80b, and 80c. Optical coupler 78 is operative to direct an optical wave returning from 3-port optical coupler 74 toward detector 80b. Similarly, second Sagnac interferometer 14 comprises an optical coupler 82 interposed between light source 20 and 3-port optical coupler 76 and three detectors 84a, 84b, and 84c. Optical coupler 82 is operative to direct an optical wave returning from 3-port optical coupler 76 toward detector 84b.

Light source 16, optical coupler 78, 3-port optical coupler 74, associated WDM couplers 40, 42, and detectors 80a, 80b, and 80c are located at near end 64, and again, because the configuration of fiber optic sensor 72 requires second Sagnac loop 34 to be opposite first Sagnac loop 26, 3-port optical coupler 76 and WDM couplers 36, 38 are located at far end 66. Also, as with fiber optic sensor 10 in FIG. 2, light source 20 and detectors 84a, 84b, and 84c are located at near end 64. Here, an approach fiber 86 extends along the length of the cable between optical coupler 82 and 3-port optical coupler 76, and return fibers 88, 90 respectively extend along the length of the cable between detectors 84a and 84c and 3-port optical coupler 76.

In use, light propagates from light sources 16 and 20 to 3-port optical couplers 74 and 76, which operate in a similar fashion to optical couplers 18 and 22 described above. After the counter-propagating optical waves have propagated around first and second Sagnac loops 26 and 34, they interfere at 3-port optical couplers 74 and 76. The combined optical wave output from 3-port optical coupler 74 is detected at each of detectors 80a, 80b, and 80c. However, as explained in the '524 patent, as a result of the use of 3-port optical coupler 74 and optical coupler 78, the intensities detected at each of detectors 80a, 80b, and 80c are shifted in phase by $2/3\pi$ radians relative to each other. This is likewise the case for the combined optical wave output from 3-port optical coupler 76 detected at each of detectors 84a, 84b, and 84c. For each detector in fiber optic sensor 72, during predetermined angular "sections" of $\pi/3$ radians, the relationship between the detected intensity and the phase difference between the counter-propagating optical waves is approximately linear.

Notably, fiber optic sensor 72 then can automatically determine the phase difference between the counter-propagating optical waves in each Sagnac loop by following a predetermined measurement sequence. For example, fiber optic sensor 72 first measures the intensity from the detector (e.g., detector 80*a*) the detected intensity at which is within a predetermined angular section at a given time. When the intensity at detector 80*a* is no longer within the predetermined angular section, fiber optic sensor 72 measures the intensity from the detector the detected intensity at which is then within a predetermined angular section (e.g., 80*b* or 80*c*). The measurements then continue sequentially from the appropriate detector in this fashion. As explained in the '524 patent, this method can similarly be used with optical couplers having 4, 5, or more ports.

However, like fiber optic sensor 10 shown in FIG. 2, fiber optic sensor 72 is unsuitable for use in many sensing applications, including in a downhole cable in an oil or gas well. Here, the cable in which fiber optic sensor 10 is used must have a diameter D sized to accommodate a thickness of five optical fibers and the components provided at far end 66. Again, this diameter D is too large for a typical downhole cable for oil and gas well applications.

In contrast, embodiments of the present invention provide a fiber optic sensor comprising dual Sagnac interferometers which may be operated in the same direction on an optical sensing loop. This allows optical couplers for each Sagnac loop to be located on the same side of a sensing loop and consequently allows the sensor to have a much smaller diameter or thickness than conventional sensors. Among other benefits described in more detail below, the configuration of embodiments of the present invention enables use with a downhole cable for oil and gas well applications.

Figure 4:
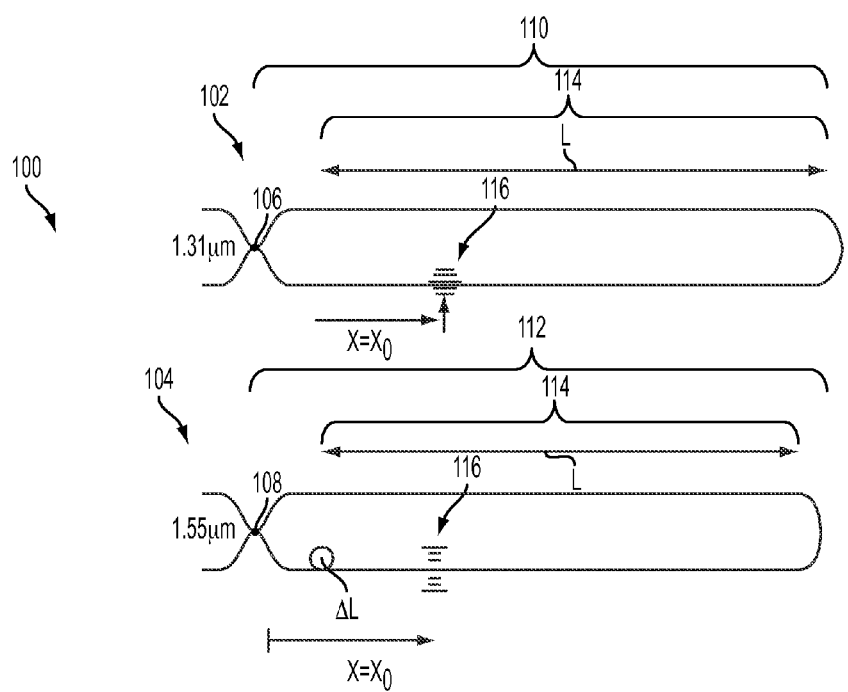
FIG. 4 is a simplified schematic representation of a dual Sagnac interferometer configuration in accordance with an embodiment of the present invention, wherein the interferometers operate in the same direction on a common fiber optic sensing loop.

An overview of one embodiment of the present invention is provided with reference to FIG. 4, which is a simplified schematic representation of a fiber optic sensor 100 comprising dual Sagnac interferometers 102, 104. To facilitate explanation, Sagnac interferometers 102 and 104, which respectively comprise WDM couplers 106 and 108 and Sagnac loops 110 and 112, are shown separately in FIG. 4. However, it will be appreciated that, in use, Sagnac interferometers 102 and 104 respectively operate at wavelengths of 1.31 μm and 1.55 μm in the same direction along a fiber optic sensing loop 114 having length 2L that is common to both Sagnac interferometers 102, 104. Those of skill in the art will appreciate that, in other embodiments, Sagnac interferometers 102, 104 may operate at wavelengths other than 1.31 μm and 1.55 μm.

As noted above, in the prior art configuration, it is not possible to calculate the position and amplitude of a vibration 116 occurring at point $x_0$ on sensing loop 114 where Sagnac interferometers 102 and 104 operate in the same direction. Therefore, in fiber optic sensor 100, the optical path along which light of 1.55 μm travels is different from the optical path along which light of 1.31 μm travels by a predetermined length 2ΔL. In this embodiment, the excess length of optical fiber in Sagnac loop 112 is provided "upstream" of sensing loop 114, which as noted above is common to both interferometers 102, 104.

In this configuration, the phase difference $\Delta\phi_{1.5}$ between optical waves of 1.55 μm light traveling in clockwise and counterclockwise directions in Sagnac loop 112 can be determined by the following equation:

$$\Delta\phi_{1.5} = \frac{2\pi}{\lambda_{1.5}} \cdot \frac{dx}{dt}(x = x_0) \cdot \left(\frac{2L - 2x_0 - \Delta L}{v}\right)$$

Further, the location of vibration 116 occurring at point $x_0$ on sensing loop 114 may be determined by the following equation:

$$x_0 = L + \left(\frac{\Delta L}{2}\right) \cdot \frac{\lambda_{1.3} \cdot \Delta\phi_{1.3}}{(\lambda_{1.5} \cdot \Delta\phi_{1.5} - \lambda_{1.3} \cdot \Delta\phi_{1.3})}$$

Finally, the amplitude $$\frac{dx}{dt}(x = x_0)$$

may be determined by the following equation:

$$\frac{dx}{dt}(x = x_0) = \left(\frac{c}{n}\right) \cdot \frac{1}{2\pi \cdot \Delta L \cdot (\lambda_{1.5} \cdot \Delta\phi_{1.5} - \lambda_{1.3} \cdot \Delta\phi_{1.3})}$$

Thus, by extending the optical path along which light having a wavelength of 1.55 μm travels by the predetermined length 2ΔL, embodiments of the present invention enable a determination of the position and amplitude of a vibration acting on the sensing loop in a configuration wherein dual Sagnac interferometers operate in the same direction. In one embodiment, the length ΔL may be approximately several percent of the length L. Also, in alternative embodiments, those of skill in the art will appreciate that the optical path of the 1.31 μm light could be extended instead of the optical path for 1.55 μm light, and the position and amplitude of a vibration acting on the sensing loop may be calculated with slight modification to the above equations.

Figure 5:
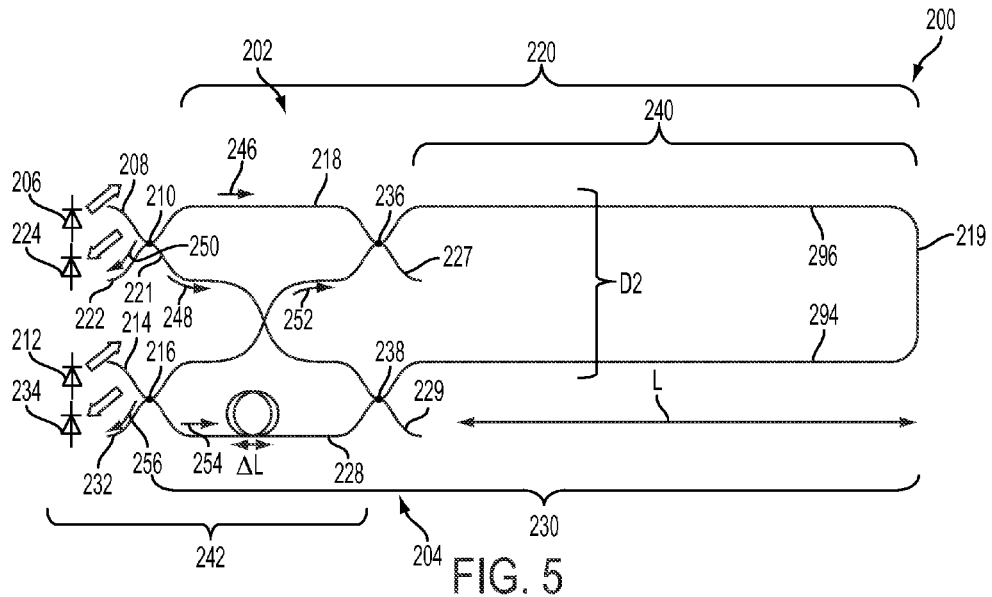
FIG. 5 is a schematic representation of a fiber optic sensor constructed in accordance with an embodiment of the present invention.

This configuration has a number of advantages. For example, FIG. 5 is a schematic representation of a fiber optic sensor 200 having the above dual Sagnac interferometer configuration constructed in accordance with one embodiment of the present invention. Fiber optic sensor 200 comprises a first Sagnac interferometer 202 and a second Sagnac interferometer 204. First Sagnac interferometer 202 comprises a light source 206 coupled to an optical fiber 208. Light source 206, which may preferably be analogous to light source 16 described above, is operative to provide light at a wavelength of 1.31 μm along optical fiber 208 to a first optical coupler 210. Similarly, second Sagnac interferometer 204 comprises a light source 212 coupled to an optical fiber 214. Light source 212, which may preferably be analogous to light source 20 described above, is operative to provide light at a wavelength of 1.55 μm along optical fiber 214 to a second optical coupler 216.

Optical fibers 218, 219, and 221 form a first Sagnac loop 220 beginning and ending at optical coupler 210. Splicing, or another suitable method as described above, may be used to operatively connect optical fibers 208, 218, 219, and 221. First Sagnac interferometer 202 also comprises an optical fiber 222 operatively connected with optical coupler 210 and a detector 224 for light having a wavelength of 1.31 μm. Optical fiber 221 may be operatively connected with optical fiber 222 as described above.

Additionally, along with optical fiber 219, optical fibers 226 and 228 form a second Sagnac loop 230 beginning and ending at optical coupler 216. Second Sagnac interferometer 204 also comprises an optical fiber 232 operatively connected with optical coupler 216 and a detector 234 for light having a wavelength of 1.55 μm. The end of optical fiber 226 proximate optical coupler 216 may be connected with optical fiber 214 as described above. Additionally, the other end of optical fiber 226 may be coupled with a first WDM coupler 236. Thereby, optical fiber 226 may guide 1.55 μm wavelength light to WDM coupler 236, which may multiplex the 1.55 µm wavelength light with 1.31 µm wavelength light propagating along optical fiber 219. Optical fiber 226 may include an optical termination 227 to avoid back reflection, as is well known. For example, optical termination 227 may be constructed by crushing an end of fiber 226 and covering it with index matching cement. Similarly, the end of optical fiber 228 proximate optical coupler 216 may be connected with optical fiber 232 as described above, and the other end of optical fiber 228 may be coupled with a second WDM coupler 238. As with WDM coupler 236, WDM coupler 238 is operative to multiplex 1.55 µm wavelength light propagating along optical fiber 228 with 1.31 µm wavelength light propagating along optical fiber 219. Optical fiber 228 may include an optical termination 229. WDM couplers 236, 238 may preferably be analogous to WDM couplers 36, 38, 40, and 42 described above.

Based on the above, it will be appreciated that a portion of the optical path along which light propagates in first Sagnac interferometer 202 is shared with the optical path along which light propagates in second Sagnac interferometer 204. More specifically, optical fiber 219 forms a sensing loop 240 having length 2L extending between first and second WDM couplers 236 and 238. Thus, sensing loop 240 is a common optical path for first and second Sagnac interferometers 202, 204.

However, as described above with respect to FIG. 4, the optical path along which 1.55 µm wavelength light propagates in this embodiment is longer than the optical path along which 1.31 µm wavelength light propagates by a length 2ΔL. This excess length may be provided by making each of optical fibers 226 and 228 longer by a length ΔL than optical fibers 218 and 221, respectively.

Again, by extending the optical path for 1.55 µm wavelength light, both Sagnac interferometers 202, 204 may operate in the same direction. This allows the optical couplers 210, 216 and WDM couplers 236, 238 to be located at a near end 242 of fiber optic sensor 200, while an opposite far end 244 of fiber optic sensor 200 comprises only a bent length of optical fiber 219. In one embodiment, the diameter of bending may be approximately 1.5 mm. Those of skill in the art are familiar with techniques for forming the bend in optical fiber 219, such as the MiniBend miniature fiber optic component offered by AFL. Importantly, this enables the sensing loop 240 of fiber optic sensor 200 to have a diameter D2 that is smaller than the diameter D in the prior art configuration. Thus, the configuration illustrated in FIG. 5 may readily be implemented in a downhole cable in an oil or gas well. Indeed, as shown in FIG. 5, the sensing loop has a minimum thickness of only two optical fibers, whereas the configuration shown in FIG. 2 requires a thickness of at least four optical fibers along the cable length (i.e., to accommodate sensing loop 44 and approach and return fibers 68, 70), and the configuration shown in FIG. 3 requires a thickness of at least five optical fibers along the cable length.

In use, an optical wave having a wavelength of 1.31 µm from light source 206 propagating along optical fiber 208 enters optical coupler 210, where it is split into clockwise and counterclockwise propagating optical waves 246 and 248. Clockwise optical wave 246 propagates along optical fiber 218, next encountering WDM coupler 236. Clockwise optical wave 246 passes through WDM coupler 236 and then continues along optical fiber 219 around sensing loop 240, arriving at WDM coupler 238, where it passes through onto optical fiber 221. Clockwise optical wave 246 then returns to optical coupler 210. Similarly, counterclockwise optical wave 248 propagates along optical fiber 221, first encountering WDM coupler 238. Counterclockwise optical wave 248 passes through WDM coupler 238 and then continues along optical fiber 219 around sensing loop 240 in the opposite direction, arriving at WDM coupler 236, where it likewise passes through onto optical fiber 218. Counterclockwise optical wave 248 then also returns to optical coupler 210. Upon their return, optical waves 246, 248 interfere at optical coupler 210 to form a combined optical wave 250 propagating along optical fiber 222. Optical wave 250 is detected at detector 224, which transmits signals regarding the intensity of optical wave 250 to suitable signal processing circuitry (not shown in FIG. 5).

At the same time, an optical wave having a wavelength of 1.55 µm from light source 212 propagates along optical fiber 214 and enters optical coupler 216, where it is split into clockwise and counterclockwise propagating optical waves 252 and 254. Clockwise optical wave 252 propagates along optical fiber 226, next encountering WDM coupler 236. WDM coupler 236 then couples clockwise optical wave 252 with optical fiber 219, and optical wave 252 then propagates around sensing loop 240, arriving at WDM coupler 238, where it is decoupled from optical fiber 219 onto optical fiber 228. Clockwise optical wave 252 then returns to optical coupler 216. Also, counterclockwise optical wave 254 propagates along optical fiber 228, first encountering WDM coupler 238. WDM coupler 238 then couples counterclockwise optical wave 254 with optical fiber 219, and optical wave 254 continues around sensing loop 240 in the opposite direction, arriving at WDM coupler 236, where it is likewise decoupled from optical fiber 219 onto optical fiber 226. Counterclockwise optical wave 254 then also returns to optical coupler 216. Upon their return, optical waves 252, 254 interfere at optical coupler 216 to form a combined optical wave 256 propagating along optical fiber 232. Optical wave 256 is detected at detector 234, which transmits signals regarding the intensity of optical wave 256 to the signal processing circuitry mentioned above. Those of skill in the art will appreciate that, in some circumstances, combined optical waves 250, 256 may additionally propagate back toward light sources 206, 212 along optical fibers 208, 214, respectively. However, some embodiments of the present invention may include isolators positioned to interrupt the travel of combined optical waves 250, 256 along optical fibers 208, 214.

As explained above, where an environmental effect, such as a vibration, acts on sensing loop 240, the vibration modulates the length of a section of the optical path along sensing loop 240 at the frequency of the vibration. Consequently, optical wave 246 will arrive at optical coupler 210 at a different time than optical wave 248, and optical wave 252 will arrive at optical coupler 216 at a different time than optical wave 254. Thus, there will be a phase difference between optical waves 246, 248 and 252, 254, and the intensities of combined optical waves 250, 256 depend on these relative phase differences. The variations in intensity are proportional to the position and amplitude of the vibration. Suitable signal processing circuitry can use the equations explained above with respect to FIG. 4 to determine the location and amplitude of the vibration on sensing loop 240.

Figure 6:
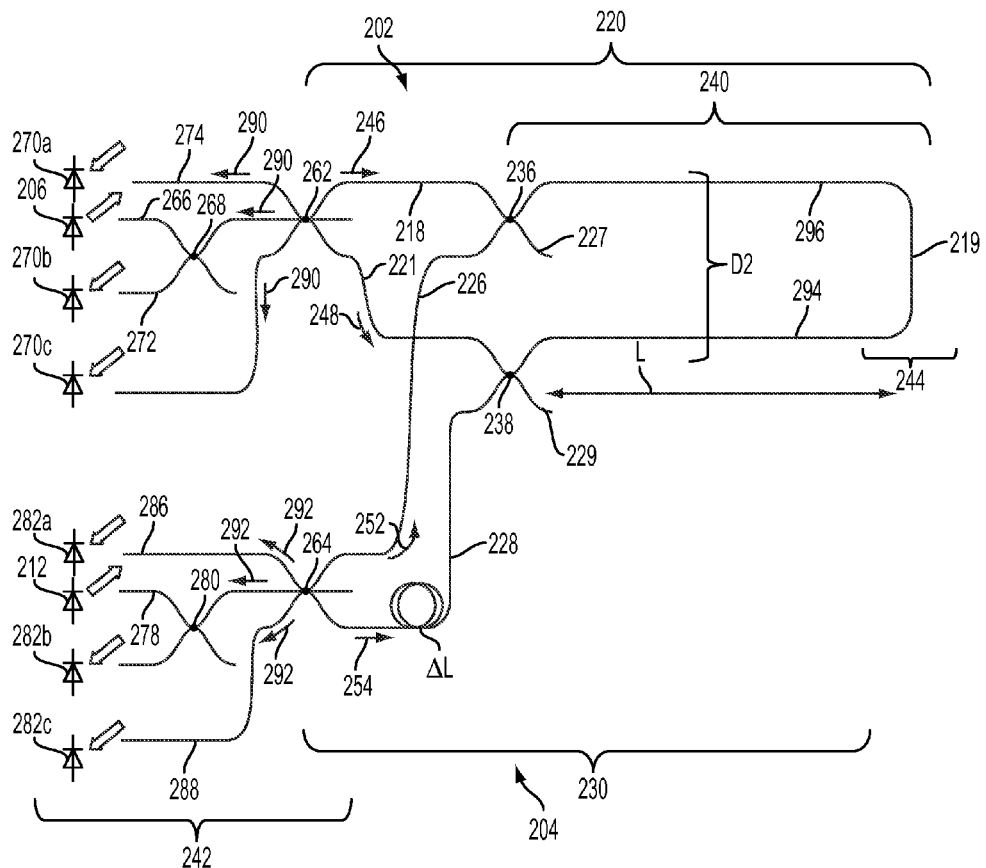
FIG. 6 is a schematic representation of a fiber optic sensor employing a 3-port optical coupler constructed in accordance with an embodiment of the present invention.

Notably, embodiments of the present invention may also employ a 3- or more-port optical coupler. In this regard, for example, FIG. 6 is a schematic representation of a fiber optic sensor 260 employing 3-port optical couplers 262 and 264 constructed in accordance with an embodiment of the present invention. Fiber optic sensor 260 may be in many respects analogous to fiber optic sensor 200, but 3-port optical couplers 262 and 264 are used in place of optical couplers 210 and 216 in first and second Sagnac interferometers 202 and 204, respectively.

In this embodiment, first Sagnac interferometer 202 also comprises an optical fiber 266 coupled between light source 206 and 3-port optical coupler 262. An optical coupler 268 may be interposed between light source 206 and 3-port optical coupler 262. Also, first Sagnac interferometer 202 comprises three detectors 270a, 270b, and 270c. Optical coupler 262 is operative to direct an optical wave returning from 3-port optical coupler 262 toward detector 270b along an optical fiber 272. Optical fiber 274 is coupled between detector 270a and another port of 3-port optical coupler 262, and optical fiber 276 is coupled between detector 270c and the third port of 3-port optical coupler 262. Optical fiber 218 may be connected with optical fiber 274, and optical fiber 221 may be connected with optical fiber 276.

Similarly, second Sagnac interferometer 204 also comprises an optical fiber 278 coupled between light source 212 and 3-port optical coupler 264. An optical coupler 280 may be interposed between light source 212 and 3-port optical coupler 264. Also, second Sagnac interferometer 204 comprises three detectors 282a, 282b, and 282c. Optical coupler 280 is operative to direct an optical wave returning from 3-port optical coupler 264 toward detector 282b along an optical fiber 284. Optical fiber 286 is coupled between detector 282a and another port of 3-port optical coupler 264, and optical fiber 288 is coupled between detector 282c and the third port of 3-port optical coupler 264. The end of optical fiber 226 proximate 3-port optical coupler 264 may be connected with optical fiber 286, and the end of optical fiber 228 proximate 3-port optical coupler 264 may be connected with optical fiber 288.

In use, 1.31 μm wavelength light propagates from light source 206 to 3-port optical coupler 262, where it is split into clockwise and counterclockwise propagating optical waves 246 and 248 as described above. After optical waves 246, 248 have propagated around sensing loop 240 and returned to 3-port optical coupler 262, they interfere to produce combined optical wave 290. Combined optical wave 290 is detected at each of detectors 270a, 270b, and 270c. As explained above with respect to FIG. 3, fiber optic sensor 260 may automatically determine the phase difference between optical waves 246, 248 (e.g., caused by vibration acting on sensing loop 240) by measuring the intensity detected at detectors 270a, 270b, and 270c in sequence based on the detector at which the intensity is within a predetermined angular section. Simultaneously, 1.55 μm wavelength light propagates from light source 212 to 3-port optical coupler 264, where it is split into clockwise and counterclockwise propagating optical waves 252 and 254 as described above. After optical waves 252, 254 have propagated around sensing loop 240 and returned to 3-port optical coupler 264, they interfere to produce combined optical wave 292. Combined optical wave 292 is detected at each of detectors 282a, 282b, and 282c. Fiber optic sensor 260 may automatically determine the phase difference between optical waves 252, 254 as described above. Based on intensity and phase difference determinations, fiber optic sensor 260 may then determine the position and amplitude of the vibration on sensing loop 240 using the equations described above with respect to FIGS. 4 and 5.

It will be appreciated that because both Sagnac interferometers 202, 204 operate in the same direction in this embodiment, 3-port optical couplers 262, 264, optical couplers 268, 280, and WDM couplers 236, 238 can be positioned at near end 242 of fiber optic sensor 260. Far end 244 again only comprises a bent length of optical fiber 219, and the diameter D2 of sensing loop 240 of fiber optic sensor 260 again is small enough to be readily implemented in a downhole cable in an oil or gas well. Those of skill in the art will appreciate that, in other embodiments, fiber optic sensor 260 may be implemented with optical couplers having more than 3 ports with similar functionality.

In some embodiments of the present invention, such as where the optical paths along which 1.55 μm wavelength light and 1.31 μm wavelength light propagate are not symmetrical, it may be desirable to reduce the sensitivity of one "leg" of the sensing loop to vibrations. For example, as shown in FIGS. 5-6, a sheathing 294 may be placed along one leg of sensing loop 240. In one embodiment, sheathing 294 may be a coating formed of a suitable metal material, such as aluminum. It will be appreciated that desensitizing one leg of sensing loop 240 to vibrations will cause a greater change in the length of the optical paths along with the counter-propagating waves travel, and thus a greater phase difference between the waves. This results in a stronger, easier to detect signal. In another embodiment, the leg of sensing loop 240 opposite the desensitized leg may be provided with a sheathing 296 which increases its sensitivity to vibrations. This again increases the change in optical path length for the counter-propagating optical waves, resulting in a stronger signal.

Figure 7:
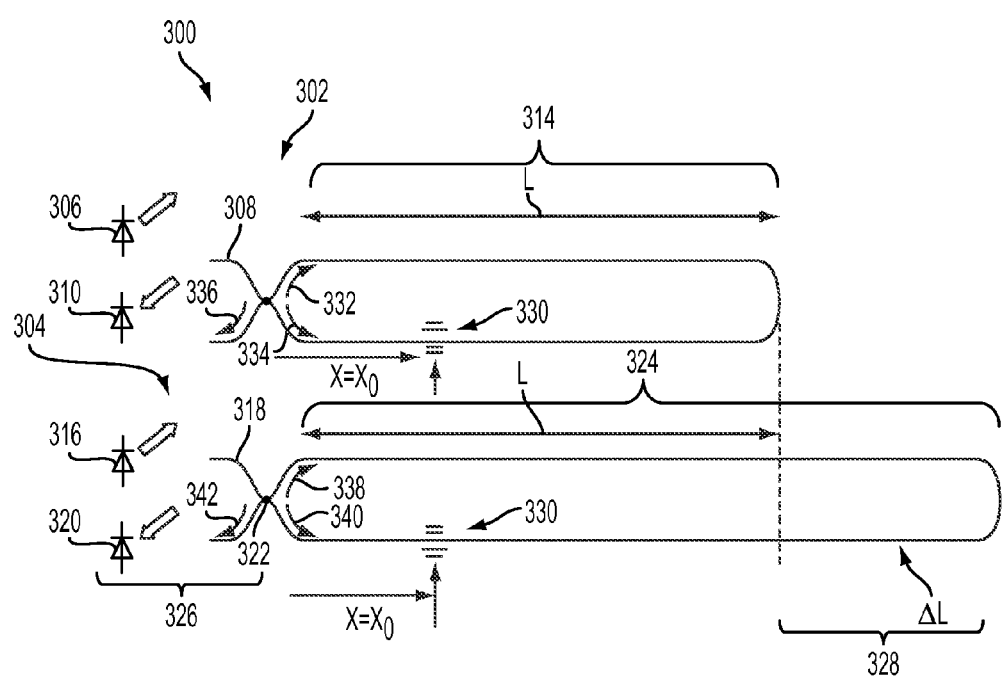
FIG. 7 is a schematic representation of a fiber optic sensor constructed in accordance with an alternative embodiment of the present invention.

Additionally, in a further embodiment of the present invention, FIG. 7 is a schematic representation of a fiber optic sensor 300. Fiber optic sensor 300 comprises first and second Sagnac interferometers 302, 304, which operate in the same direction and which may be configured for use in a downhole cable. Unlike the embodiments described above with respect to FIGS. 5 and 6, however, fiber optic sensor 300 does not comprise an optical path common to both interferometers 302, 304. In other words, interferometers 302, 304 may comprise two complete, separate loops. Although shown spaced apart in FIG. 7 to facilitate explanation, interferometers 302 and 304 may preferably be stored in the same downhole cable as explained in more detail below.

Here, first Sagnac interferometer 302 comprises a light source 306 for 1.31 μm wavelength light coupled to one end of an optical fiber 308. The other end of optical fiber 308 may be coupled with a detector 310. An optical coupler 312 is operatively connected with optical fiber 308 such that optical fiber 308 forms a first sensing loop 314 having length 2L beginning and ending at optical coupler 312.

Second Sagnac interferometer 304 comprises a light source 316 for 1.55 μm wavelength light coupled to one end of an optical fiber 318. (Those of skill in the art will appreciate that because interferometers 302, 304 may comprise two separate loops, in other embodiments second Sagnac interferometer 304 may comprise a light source operating at the same wavelength as first Sagnac interferometer 302.) The other end of optical fiber 318 may be coupled with a detector 320. An optical coupler 322 is operatively connected with optical fiber 318 such that optical fiber 318 forms a second sensing loop 324 having length 2(L+ΔL) beginning and ending at optical coupler 322. In other words, for the reasons explained in detail above with respect to FIGS. 4 and 5, the optical path for 1.55 μm wavelength light is greater than the optical path for 1.31 μm wavelength light by a length of 2ΔL in this embodiment.

Fiber optic sensor 300 may comprise a near end 326 and a far end 328. As suggested above, interferometers 302 and 304 may preferably be positioned in the same downhole cable such that sensing loops 314 and 324 begin at the same location in the cable. In other words, sensing loops 314 and 324 are coextensive for a distance L along the downhole cable, while sensing loop 324 extends beyond sensing loop 314 for an additional distance ΔL at far end 328. Where an environmental effect, such as vibration 330, acts on sensing loop 314 at a location $x_0$ from near end 326, vibration 330 will act on sensing loop 324 in the same location. Consequently, the phase difference caused between the counter-propagating waves in second Sagnac interferometer 302 will be identical to the phase difference caused between the counter-propagating waves in second Sagnac interferometer 304. One advantage of this configuration is that a symmetric length of optical fiber may be used to form each sensing loop. In other words, where vibration 330 acts on both sensing loops 314, 324 in the same location, the interferometric signals associated with each sensing loop may be additive and in phase.

In use, an optical wave having a wavelength of 1.31 μm from light source 306 propagates along optical fiber 308, first entering optical coupler 312, where it is split into clockwise and counterclockwise propagating optical waves 332 and 334. As explained above, optical waves 332, 334 propagate in opposite directions around sensing loop 314. Upon their return, optical waves 332 and 334 interfere at optical coupler 312 to form a combined optical wave 336. Optical wave 336 is detected at detector 310, which transmits signals regarding the intensity of optical wave 336 to suitable signal processing circuitry (not shown in FIG. 7).

Similarly, an optical wave having a wavelength of 1.55 μm from light source 316 propagates along optical fiber 318, first entering optical coupler 322, where it is split into clockwise and counterclockwise propagating optical waves 338 and 340. Again, optical waves 338, 340 propagate in opposite directions around sensing loop 324, and upon their return, interfere at optical coupler 322 to form a combined optical wave 342. Optical wave 342 is detected at detector 320, which transmits signals regarding the intensity of optical wave 342 to the signal processing circuitry.

Using the equation for determining $\Delta\phi_{1.3}$ discussed above with respect to FIG. 1 and the equation for determining $\Delta\phi_{1.5}$ discussed above with respect to FIG. 4, the signal processing circuitry may determine the phase differences between the counter-propagating optical waves in each interferometers 302, 304. Then, the position of vibration 330 at location $x_0$ may be determined using the following equation:

$$x_0 = \frac{\lambda_{1.5} \cdot \Delta\phi_{1.5}}{\lambda_{1.3} \cdot \Delta\phi_{1.3} \cdot L \cdot (L + \Delta L) \cdot (\lambda_{1.5} \cdot \Delta\phi_{1.5} - \lambda_{1.3} \cdot \Delta\phi_{1.3})}$$

Additionally, the amplitude $$\frac{dx}{dt}(x = x_0)$$

may be determined by the following equation:

$$\frac{dx}{dt}(x = x_0) = \frac{\lambda_{1.3} \cdot \Delta\phi_{1.3}}{4\pi \cdot v \cdot (L - x_0)}$$

Again, although the embodiment shown in FIG. 7 utilizes 2-port optical couplers, those of skill in the art will appreciate that this embodiment may also be used with a 3- or more port optical coupler, as described above.

It can thus be seen that the present invention provides a novel fiber optic sensor configuration. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fiber optic sensor for sensing an environmental effect, comprising:
    a sensing loop comprising an optical fiber having a first end and a second end;
    a first light source operative to produce first wavelength light;
    a second light source operative to produce second wavelength light;
    a first optical coupler operatively connected with said first light source that splits said first wavelength light into first and second optical waves;
    said first optical coupler operative to direct said first and second optical waves along a first optical path into said first and second ends of said optical fiber, respectively, such that said first optical wave propagates around said sensing loop to said second end of said optical fiber, said second optical wave propagates around said sensing loop to said first end of said optical fiber, and said first and second optical waves interfere at said first optical coupler to form a first combined optical wave;
    a second optical coupler operatively connected with said second light source that splits said second wavelength light into third and fourth optical waves;
    said second optical coupler operative to direct said third and fourth optical waves along a second optical path into said first and second ends of said optical fiber, respectively, such that said third optical wave propagates around said sensing loop to said second end of said optical fiber, said fourth optical wave propagates around said sensing loop to said first end of said optical fiber, and said third and fourth optical waves interfere at said second optical coupler to form a second combined optical wave;
    said second optical path being longer than said first optical path by a predetermined distance;
    a first detector operative to receive said first combined optical wave and output information regarding said first combined optical wave; and
    a second detector operative to receive said second combined optical wave and output information regarding said second combined optical wave.

2. The fiber optic sensor of claim 1, further comprising first and second wavelength-division multiplexing (WDM) couplers each having a through port and a cross port, said first and second WDM couplers operative to couple only said first wavelength light to their respective through ports and to couple only said second wavelength light to their respective cross ports.

3. The fiber optic sensor of claim 2, said first optical coupler comprising first and second ports, wherein said through port of said first WDM coupler is in optical communication with said first port of said first optical coupler and said first end of said optical fiber, and wherein said through port of said second WDM coupler is in optical communication with said second port of said first optical coupler and said second end of said optical fiber.

4. The fiber optic sensor of claim 3, said second optical coupler comprising first and second ports, wherein said cross port of said first WDM coupler is operatively connected between said first port of said second optical coupler and said first end of said optical fiber, and wherein said cross port of said second WDM coupler is operatively connected between said second port of said second optical coupler and said second end of said optical fiber.

5. The fiber optic sensor of claim 1, further comprising a signal processor operative to receive from said first detector and said second detector information regarding said first and second combined optical waves.

6. The fiber optic sensor of claim 5, wherein said signal processor is operative to determine characteristics of said environmental effect based on said information regarding said first and second combined optical waves.

7. The fiber optic sensor of claim 1, wherein at least a portion of said fiber sensing loop is housed in a cable.

8. The fiber optic sensor of claim 1, wherein said first and second optical couplers each comprise three ports.

9. The fiber optic sensor of claim 1, wherein said first wavelength light has a wavelength of approximately 1.31 µm and said second wavelength light has a wavelength of approximately 1.55 µm.

10. The fiber optic sensor of claim 1, wherein said fiber optic sensor has a near end and a far end and wherein said first and second optical couplers are located at said near end.

11. A fiber optic sensor, comprising:
an optical fiber, said optical fiber having a first end and a second end;
a first light source operative to produce first wavelength light;
a second light source operative to produce second wavelength light;
a first optical coupler in optical communication with said first light source to receive said first wavelength light;
a first optical path extending between said first optical coupler and said first and second ends of said first optical fiber such that said first optical coupler is operative to direct first and second optical waves formed from said first wavelength light into said first and second ends, respectively, of said first optical fiber;
a second optical coupler in optical communication with said second light source to receive said second wavelength light;
a second optical path extending between said second optical coupler and said first and second ends of said first optical fiber such that said second optical coupler is operative to direct third and fourth optical waves formed from said second wavelength light into said first and second ends, respectively, of said first optical fiber;
wherein said first and third optical waves propagate from said first end to said second end of said first optical fiber, said second and fourth optical waves propagate from said second end to said first end of said first optical fiber;
wherein said second optical path is longer than said first optical path;
wherein said first and second optical waves interfere to form a first combined optical wave and said third and fourth optical waves interfere to form a second combined optical wave;
a first detector in optical communication with said first optical coupler to receive said first combined optical wave; and
a second detector in optical communication with said second optical coupler to receive said second combined optical wave.

12. The fiber optic sensor of claim 11, further comprising first and second wavelength-division multiplexing (WDM) couplers each having a through port and a cross port, said first and second WDM couplers operative to couple only said first wavelength light to their respective through ports and to couple only said second wavelength light to their respective cross ports.

13. The fiber optic sensor of claim 12, said first optical coupler comprising first and second ports, wherein said through port of said first WDM coupler is in optical communication with said first port of said first optical coupler and said first end of said first optical fiber, and wherein said through port of said second WDM coupler is in optical communication with said second port of said first optical coupler and said second end of said first optical fiber.

14. The fiber optic sensor of claim 13, said second optical coupler comprising first and second ports, wherein said cross port of said first WDM coupler is in optical communication with said first port of said second optical coupler and said first end of said first optical fiber, and wherein said cross port of said second WDM coupler is in optical communication with said second port of said second optical coupler and said second end of said first optical fiber.

15. The fiber optic sensor of claim 11, further comprising a signal processor operative to receive from said first detector and said second detector information regarding said first and second combined optical waves.

16. The fiber optic sensor of claim 15, wherein said signal processor is operative to determine characteristics of an environmental effect based on said information regarding said first and second combined optical waves.

17. The fiber optic sensor of claim 11, wherein said first and second optical couplers each comprise three ports.

18. The fiber optic sensor of claim 11, wherein said first wavelength light has a wavelength of approximately 1.31 µm and said second wavelength light has a wavelength of approximately 1.55 µm.

* * * * *